Patented July 29, 1924.

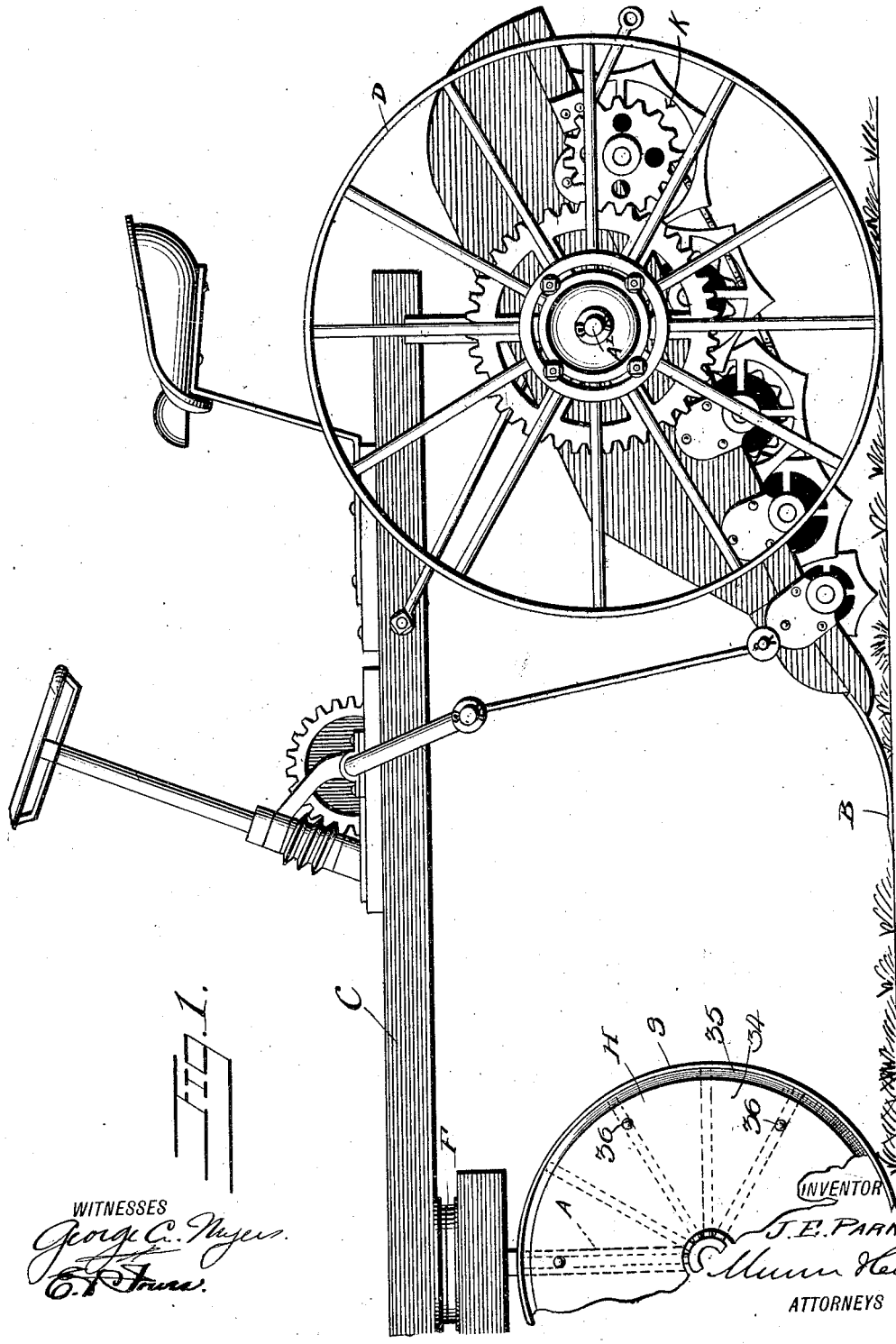

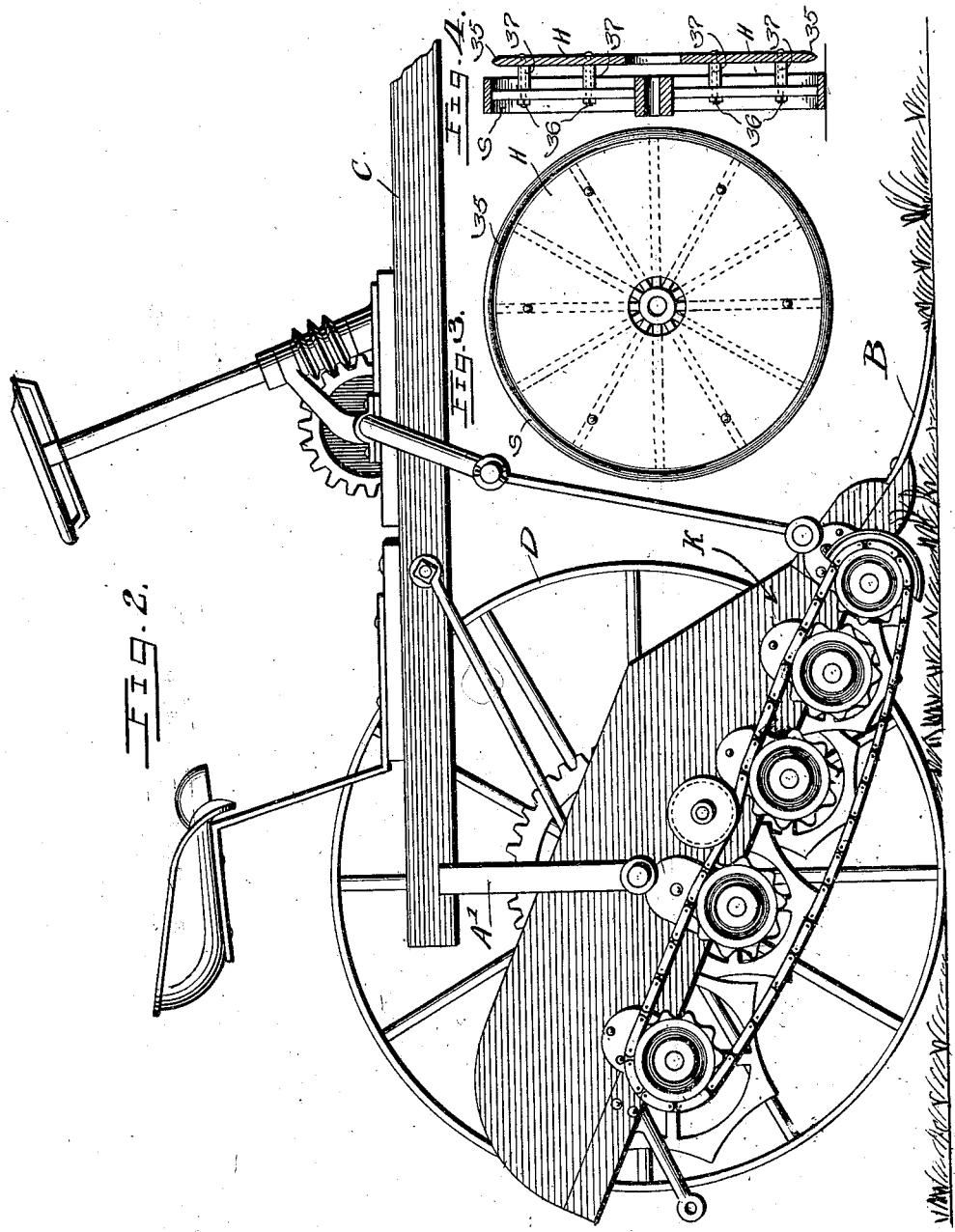

1,502,795

UNITED STATES PATENT OFFICE.

JAMES E. PARKER, OF NORFOLK, VIRGINIA.

PEANUT DIGGER.

Application filed June 1, 1920. Serial No. 385,596.

*To all whom it may concern:*

Be it known that I, JAMES EDWARD PARKER, a citizen of the United States, and a resident of Norfolk, in the county of Norfolk and State of Virginia, have invented certain new and useful Improvements in Peanut Diggers, of which the following is a specification.

My invention relates to peanut diggers, and a purpose of my invention is the provision of a peanut digger comprising cutting members operable to effect a cutting of the vines within and above the soil and at a point in advance of a conveyor, and a digging implement for removing and elevating the vines to the conveyor, such conveyor and implement being adjustable to various positions to suit the particular character of vines and ground over which the digger is travelling.

I will describe one form of peanut digger embodying my invention and will then point out the novel features thereof in claims.

In the accompanying drawings:

Figure 1 is a view showing in side elevation one form of peanut digger embodying my invention.

Figure 2 is a view similiar to Figure 1 showing the opposite side of the digger.

Figure 3 is a detail view showing in side elevation one of the steering wheels of the digger having applied thereto one form of cutting member embodying my invention and Figure 4 is a vertical sectional view of Figure 6.

Similar reference characters refer to similar parts in each of the several views.

Referring specifically to the drawings and particularly to Figure 1, C designates the chassis of the digger which is supported at its rear end by driving wheels D mounted on the opposite ends of a substantially U-shaped axle A′, the intermediate portion of such axle being secured to the under side of the chassis in the manner shown. The forward end of the chassis C is supported upon a fifth wheel F, and the latter is connected to a front axle A carrying steering wheels S thereon.

Referring now to Figures 1, 3 and 4, I have here shown the steering wheels S of the digger provided with cutting members H for effecting a cutting of the peanut vines at points both above and below the soil, and into proper lengths so that they can be removed by the implement B and readily elevated and conveyed to a desired point by the conveyor K. In the present instance, each cutting member H comprises a disc 34 having its periphery bevelled to provide a continuous cutting edge 35. The cutting member is supported upon the wheel for rotation therewith by means of bolts 36 which extend through suitable openings formed in the disc and spokes of the wheel. Embracing the bolts at a point between the disc and spokes are sleeves 37, such sleeves serving to maintain the disc in spaced relation to the wheel as will be understood. As shown in Figure 4, the diameter of the disc 34 is such that the cutting edge 35 is disposed within the circumference of the felly of the wheel so that when the implement is not in use and is traversing a roadway, the disc will not contact with the roadway and thus maintains its sharpened edge. However, when the wheel is traversing a field, the soil of which is relatively soft, it will sink into the same a distance sufficient to allow the cutting edge of the disc to penetrate the soil and to thus effect a cutting of the vines both above and beneath the soil.

The operation of the implement is as follows:

The digging implement having been properly adjusted, the vehicle is advanced causing rotation of the discs 34. The discs 34 cooperate with each other in effecting a cutting of the vines into lengths which permit the digging implement to extricate and elevate them to the lower end of the conveyor K. As the discs 34 are arranged in advance of the digging implement, it will be clear that as the vehicle traverses a field the vines are first cut and subsequently engaged by the digging implement and thus introduced to the lower end of the conveyor.

What I claim is:

1. A peanut digger comprising a chassis, axles secured at the front and rear of the chassis, drive wheels mounted on the rear axle, spaced apart steering wheels mounted on the front axle, cutting discs secured to one side of the steering wheels and of less diameter than said wheels, said discs operable to effect a cutting of the vines within and above the soil, a conveyor at the rear of said discs, and a digging plowpoint mounted to function between said discs and conveyor, said digging point being adapted to penetrate the soil to extricate and elevate the vines to said conveyor.

2. In a peanut digger including a chassis, steering wheels and driving wheels supporting the chassis at the front and rear respectively, discs fixed to the steering wheels, said discs being of a diameter less than that of the steering wheels and having their peripheries sharpened to provide cutting edges, a conveyor supported between the driving wheels, and a digging implement between said conveyor and said discs.

3. The combination in a peanut digger, of a pair of spaced-apart steering wheels, and a disk arranged parallel to the side of each wheel and secured in spaced relation thereto, said disk being of less diameter than the wheel and having its periphery sharpened to provide a cutting edge.

4. A peanut digger comprising a chassis, front and rear axles secured to the chassis, drive wheels mounted on the rear axle, spaced steering wheels mounted on the front axle, a cutting disk for each of the steering wheels and of a less diameter than said wheels, means whereby said disks are spacedly mounted in respect to said wheels, a conveyor at the rear of said disks, and a digging plow point mounted in advance of the conveyor and being adapted to penetrate the soil to extricate and elevate the vines to the conveyor.

5. In a peanut digger, the combination of a wheel, a disk having a sharpened periphery and being of a diameter less than that of the wheel, and a plurality of elements secured both to the disk and to parts of the wheel to hold the disk in spaced relationship to the latter.

6. The combination in a peanut digger, of a wheel, a circular element having a peripheral cutting edge and being of a diameter less than that of the wheel, and a plurality of spacers for holding the circular element a predetermined distance from the side of the wheel.

7. In a peanut digger, a wheel, a cutting member of a diameter less than that of the wheel, a plurality of sleeves for spacing said member from the wheel, and means passing through said member, sleeves and portions of the wheel to secure all of the parts together.

JAMES E. PARKER.